US012678776B2

(12) United States Patent
Gao et al.

(10) Patent No.: US 12,678,776 B2
(45) Date of Patent: Jul. 14, 2026

(54) ALUMINA MATRIX MODIFICATION IN FCC CATALYST COMPOSITION

(71) Applicant: BASF CORPORATION, Florham Park, NJ (US)

(72) Inventors: Xingtao Gao, Iselin, NJ (US); David M. Stockwell, Iselin, NJ (US); Junmei Wei, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 654 days.

(21) Appl. No.: 18/021,697

(22) PCT Filed: Jul. 14, 2021

(86) PCT No.: PCT/US2021/041605
§ 371 (c)(1),
(2) Date: Feb. 16, 2023

(87) PCT Pub. No.: WO2022/039856
PCT Pub. Date: Feb. 24, 2022

(65) Prior Publication Data
US 2024/0091748 A1     Mar. 21, 2024

Related U.S. Application Data

(60) Provisional application No. 63/067,397, filed on Aug. 19, 2020.

(51) Int. Cl.
| | |
|---|---|
| *B01J 29/08* | (2006.01) |
| *B01J 21/12* | (2006.01) |
| *B01J 35/30* | (2024.01) |
| *B01J 35/50* | (2024.01) |
| *B01J 35/61* | (2024.01) |
| *B01J 37/00* | (2006.01) |
| *B01J 37/04* | (2006.01) |
| *B01J 37/08* | (2006.01) |
| *C10G 11/05* | (2006.01) |

(52) U.S. Cl.
CPC ............. *B01J 29/088* (2013.01); *B01J 21/12* (2013.01); *B01J 35/394* (2024.01); *B01J 35/50* (2024.01); *B01J 37/0036* (2013.01); *B01J 37/0045* (2013.01); *B01J 37/04* (2013.01); *B01J 37/08* (2013.01)

(58) Field of Classification Search
CPC ........ B01J 29/088; B01J 35/394; B01J 35/50; B01J 35/615; B01J 21/12; B01J 37/0036; B01J 37/0045; B01J 37/04; B01J 37/08; B01J 2229/18; B01J 2229/42; C10G 2400/20; C10G 11/05
See application file for complete search history.

(56) References Cited

U.S. PATENT DOCUMENTS

| | | | |
|---|---|---|---|
| 5,922,639 A | 7/1999 | Alario | |
| 2002/0165083 A1 | 11/2002 | Lam | |
| 2004/0235642 A1 | 11/2004 | Xu | |
| 2008/0058197 A1 | 3/2008 | Liu et al. | |
| 2014/0021098 A1 | 1/2014 | Kumar et al. | |
| 2020/0086304 A1* | 3/2020 | Kuvettu | .............. B01J 29/7615 |

FOREIGN PATENT DOCUMENTS

| | | |
|---|---|---|
| EP | 3623043 A1 | 3/2020 |
| WO | 2012/071368 A2 | 5/2012 |
| WO | 2019118344 A1 | 6/2019 |

OTHER PUBLICATIONS

International Search Report and Written Opinion for International Patent Application No. PCT/US201/041605 dated Oct. 25, 2021 9 pages.
European Search Report for EP Patent Application No. 21858774.9, Issued on Jul. 15, 2024, 3 pages.

* cited by examiner

*Primary Examiner* — Yong L Chu

(74) *Attorney, Agent, or Firm* — Peter DiMauro

(57) ABSTRACT

The present technology provides a fluid catalytic cracking (FCC) catalyst composition that includes a Y-zeolite that includes a rare earth element or oxide thereof and an alumina matrix, wherein the alumina matrix includes y-AhCb or pseudo-boehmite and a dopant; and the dopant is selected from a Group IIIB metal, Group IVB metal, Group IV A element, Group VA element, an oxide thereof, or a combination of two or more thereof.

17 Claims, No Drawings

ALUMINA MATRIX MODIFICATION IN FCC CATALYST COMPOSITION

CROSS REFERENCE TO RELATED APPLICATION(S)

The present application is a national stage entry under 35 U.S.C. § 371 of International Application No. PCT/US2021/041605, filed on Jul. 14, 2021, which claims priority to U.S. Provisional Patent Application No. 63/067,397, filed on Aug. 19, 2020, the entirety of which are incorporated herein by reference in their entirety.

FIELD

The present technology relates generally to fluid catalytic cracking (FCC) catalyst compositions. In particular, the present technology relates to FCC catalysts having a modified alumina matrix.

SUMMARY

In one aspect, the present technology provides a fluid catalytic cracking (FCC) catalyst composition that includes a Y-zeolite, wherein the Y-zeolite includes a rare earth element or oxide thereof and an alumina matrix, wherein the alumina matrix includes $\gamma$-$Al_2O_3$ or pseudo-boehmite and a dopant; and the dopant is selected from a Group IIIB metal, a Group IVB metal, a Group IVA element, a Group VA element, an oxide thereof, or a combination of any two or more thereof.

In a related aspect, the present technology provides a process for preparing an FCC catalyst that includes:

milling a first slurry includes an alumina matrix material to a D90 particle size distribution of about 8 microns or less, or milling a second slurry includes a Y-zeolite having a rare earth element or oxide thereof to a D90 particle size distribution of about 5 microns or less; or co-milling a slurry mixture comprising the Y-zeolite includes a rare earth element or oxide thereof and the alumina matrix material to a D90 particle size distribution of about 5 microns or less;

combining the alumina matrix and the Y-zeolite with one or more additional components to obtain a mixture;

spray drying the mixture to form microspheres; and calcining the microspheres to obtain the FCC catalyst, where the alumina matrix includes $\gamma$-$Al_2O_3$ or pseudo-boehmite and a dopant; and the dopant is selected from a Group IIIB metal, a Group IVB metal, a Group IVA element, a Group VA element, an oxide thereof, or a combination of any two or more thereof.

In another aspect, the present technology provides an incorporated FCC catalyst prepared according to the process described herein in any embodiment.

In another aspect, the present technology provides a catalyst composition that includes a first FCC catalyst that includes a Y-zeolite having a rare earth element or oxide thereof and an alumina matrix; a second FCC catalyst that are different from the first FCC catalyst; and optionally additional FCC catalysts that are different from the first and the second FCC catalysts; wherein the alumina matrix includes $\gamma$-$Al_2O_3$ or pseudo-boehmite and a dopant, and the dopant is selected from a Group IIIB metal, a Group IVB metal, a Group IVA element, a Group VA element, an oxide thereof, or a combination of any two or more thereof.

In another related aspect, the present technology provides a method of cracking a hydrocarbon feed comprising contacting said feed with a FCC catalyst that includes a FCC catalyst as described herein in any embodiment.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "catalyst" refers to a material that promotes a reaction.

As used herein, the term "fluid catalytic cracking" or "FCC" refers to a conversion process in petroleum refineries wherein high-boiling, high-molecular weight hydrocarbon fractions of petroleum crude oils are converted to more valuable gasoline, olefinic gases, and other products.

"Cracking" refers to typical FCC process conditions. Typical FCC processes are conducted at reaction temperatures of 450° C. to 650° C. with catalyst regeneration temperatures of 600° C. to 850° C. Catalytic cracking is a petroleum refining process that is applied commercially on a very large scale. Catalytic cracking, and particularly fluid catalytic cracking (FCC), is routinely used to convert heavy hydrocarbon feeds to lighter products, such as gasoline and distillate range fractions. The cracked products are fractioned into a series of products, including gas, gasoline, light gas oil, and heavy cycle gas oil. Some heavier hydrocarbons may be recycled to the reactor.

As used herein, the term "feed" refers to that portion of crude oil that has a high coiling point and a high molecular weight. In FCC processes, a hydrocarbon feed is injected into the riser section of a FCC unit, where the feed is cracked into lighter, more valuable products upon contacting hot catalyst circulated to the riser-reactor from a catalyst regenerator.

As used herein, the term "zeolite" refers to a crystalline aluminosilicate with a framework based on an extensive three-dimensional network of oxygen ions and have a substantially uniform pore distribution.

As used herein, the term "microsphere" refers to catalyst particles which can be obtained by preforming via spray drying and optionally calcining the kaolin clay and other materials (such as transitional alumina). As is understood by skilled artisans, microspheres are not necessarily perfectly spherical in shape. In addition, microspheres as disclosed herein may be utilized in fluidized catalytic processes.

Refinery products of gasoline, light olefins and light cycle oil are always more valuable than bottoms fractions. Catalyst compositions that can selectively produce one of the valued fractions are desirable for refiners. It is generally known that Y-zeolite is more selective to the gasoline fraction while matrix components, such as clay matrices or alumina matrices are more selective to light olefins and light cycle oil (LCO). However, different matrix components with different properties in composition, phases, acidity and porosity, can play important role in product selectivity.

The present technology provides a modified alumina matrix with varying properties incorporated in a fluid catalytic cracking (FCC) catalyst where Y-zeolite is present. The alumina matrix may include single or mixed phases of boehmites, bayerite, gibbsite, γ-alumina, and/or other transitional-$Al_2O_3$ phases, where the alumina matrix is doped one or more elements selected from Group IIIB metals, Group IVB metals, Group IVA elements, Group VA elements (or oxides thereof). In particular, alumina matrix may be doped with La, Ce, and/or Si. It has been surprisingly discovered that FCC catalysts, which include the modified alumina matrix as described herein, limit coke and bottoms fractions. Additionally, it has been discovered that these FCC catalysts selectively produce either more gasoline or more light olefins for refineries when one of the products is more favorable than the other.

Without being bound by theory, it is believed that the zeolite and matrix play a role in product selectivity for fluid catalytic cracking. The presence of rare earth elements in Y-zeolite, which also is represented by unit-cell-size (UCS) number, may also impact the product selectivity. Higher rare earth element content or higher UCS may result in greater hydride transfer, which in turn results in lower olefin yields and increased gasoline yields. On the other hand, low rare earth element content or low UCS may yield high olefinicity products. Matrices with high surface area and low Z/M ratio may boost olefin selectivity/yields. The present inventors found the incorporated FCC catalysts of the present technology have a low Z/M favoring olefin generation, and when different alumina matrix as described herein, the FCC catalyst also exhibits different product selectivity.

In one aspect, a fluid catalytic cracking (FCC) catalyst composition is provided that includes a Y-zeolite, wherein the Y-zeolite includes a rare earth element or oxide thereof and an alumina matrix, wherein the alumina matrix includes γ-$Al_2O_3$ or pseudo-boehmite and a dopant; and the dopant is selected from a Group IIIB metal, a Group IVB metal, a Group IVA element, a Group VA element, an oxide thereof, or a combination of any two or more thereof. In any embodiment described herein, the FCC catalyst is an incorporated catalyst.

In any embodiment disclosed herein, the catalyst may include about 5 weight percent ("wt. %") to about 30 wt. % of the Y-zeolite based on total weight of the catalyst. For example, in any embodiment disclosed herein the catalyst may include the Y-zeolite in an amount of about 5 wt. %, about 10 wt. %, about 15 wt. %, about 20 wt. %, about 25 wt. %, about 30 wt. %, or any amount including and/or in between any two of the preceding values. In any embodiment disclosed herein, the Y-zeolite may be present in an amount from about 5 wt. % to about 30 wt. %, about 10 wt. % to about 25 wt. %, about 10 wt. % to about 22 wt. %, about 12 wt. % to about 20 wt. %, or any range including and/or in between any two of the preceding values.

The Y-zeolite of the FCC catalyst may include a rare earth element or an oxide thereof, where the rare earth element is yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof. In any embodiment disclosed herein, the Y-zeolite may include lanthanum or an oxide thereof.

In any embodiment, the Y-zeolite may include from about 0.1 wt. % to about 12 wt. % of the rare earth element or oxide thereof based on total weight of the Y-zeolite. For example, the Y-zeolite may include the rare earth element or oxide thereof in an amount of about 0.1 wt. %, about 0.5 wt. %, about 1.0 wt. %, about 1.5 wt. %, about 2 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, or any range including and/or in between any two of the preceding values. In any embodiment disclosed herein, the Y-zeolite may include the rare earth element or oxide thereof in an amount of about 0.1 wt. % to about 12 wt. %, about 1 wt. % to about 12 wt. %, about 3 wt. % to about 10 wt. %, about 4 wt. % to about 9 wt. %, or any range including and/or in between any two of the preceding values.

The FCC catalyst may include the alumina matrix, which may be present from about 15 wt. % to about 65 wt. %, based on total weight of the catalyst. For example, the FCC catalyst may include the alumina matrix in an amount from about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, or any range including and/or in between any two of the preceding values. In any embodiment disclosed herein, the FCC catalyst may include the alumina matrix in amounts from about 15 wt. % to about 65 wt. %, about 25 wt. % to about 60 wt. %, about 30 wt. % to about 50 wt. %, or any range including and/or in between any two of the preceding values.

In any embodiment, the dopant may be a Group IIIB metal, Group IVB metal, an oxide thereof, or a combination of any two or more thereof. Suitable Group IIIB metals, Group IVB metals, or oxides thereof, may include, but are not limited to, rare earth elements, titanium (Ti), zirconium (Zr), or mixtures thereof. Rare earth element dopants in any embodiment disclosed herein may include lanthanide series elements. For example, in any embodiment disclosed herein, the dopant may be yttrium (Y), scandium (Sc), praseodymium (Pr), neodymium (Nd), promethium (Pm), samarium (Sm), europium (Eu), gadolinium (Gd), cerium (Ce), lanthanum (La), or a mixture of any two or more thereof. In any embodiment disclosed herein, the dopant may be a Group IIIB metal or oxide thereof. For example, in any embodiment disclosed herein, the Group IIIB metal or oxide thereof may be lanthanum.

The alumina matrix may include a dopant that is a Group IIIB metal, Group IVB metal, or an oxide thereof, where the alumina matrix includes the dopant in an amount of about 0.01 wt. % to about 10 wt. % based on total weight of the alumina matrix. Suitable amounts of dopants of Group IIIB metals, Group IVB metals, or oxides thereof, in the alumina matrix may be about 0.01 wt. %, about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any range including and/or in between any two of the preceding values. In any embodiment disclosed herein, the amount of dopant selected from Group IIIB metals, Group IVB metals, or oxides thereof, in the alumina matrix may be about 0.01 wt. % to about 10 wt. %, about 0.1 wt. % to about 10 wt. %, about 1 wt. % to about 6 wt. %, or any range including and/or in between any two of the preceding values.

The alumina matrix in any embodiment disclosed herein may include a dopant that is a Group IVA element, Group VA element, an oxide thereof, or a combination of any two or more thereof. Suitable Group IVA elements, Group VA elements, or oxides thereof may include, but are not limited to, silicon (Si), germanium (Ge), tin (Sn), phosphorus (P), bismuth (Bi), or a mixture of any two or more thereof. In any embodiment disclosed herein, the dopant may be a Group IVA element or oxide thereof. For example, in any embodiment disclosed herein, the Group IVA element or oxide thereof may be silicon.

The alumina matrix in any embodiment disclosed herein may include a dopant selected from a Group IVA element, a Group VA element, or an oxide thereof, where the alumina matrix includes the dopant in an amount from about 0.01 wt. % to about 35 wt. % based on total weight of the alumina matrix. Suitable amounts of dopant selected from Group IIIB metals, Group IVB metals, or oxides thereof in the alumina matrix may include about 0.01 wt. %, about 0.05 wt. %, about 0.1 wt. %, about 0.5 wt. %, about 1 wt. %, about 3 wt. %, about 5 wt. %, about 7 wt. %, about 9 wt. %, about 11 wt. %, about 13 wt. %, about 15 wt. %, about 17 wt. %, about 19 wt. %, about 21 wt. %, about 23 wt. %, about 25 wt. %, about 27 wt. %, about 29 wt. %, about 31 wt. %, about 33 wt. %, about 35 wt. %, or any range including and/or in between any two of the preceding values. In any embodiment disclosed herein, the Group IIIB metals, Group IVB metals, or oxides thereof in the alumina matrix may be about 0.01 wt. % to about 35 wt. %, about 0.1 wt. % to about 35 wt. %, about 3 wt. % to about 25 wt. %, or any range including and/or in between any two of the preceding values.

In any embodiment disclosed herein, the dopant may be a Group IIIB metal or oxide thereof, Group IVA element or oxide thereof, or combinations thereof. For example, the dopant may be silicon, lanthanum, or a mixture thereof.

In any embodiment disclosed herein, the alumina matrix may include from about 50 wt. % to about 99 wt. % of $\gamma\text{-Al}_2\text{O}_3$ or pseudo-boehmite phase based on total weight of the alumina matrix. For example, in any embodiment disclosed herein, the alumina matrix may include the $\gamma\text{-Al}_2\text{O}_3$ or pseudo-boehmite phase in an amount of about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 99 wt. %, or any range including and/or in between any two of the preceding values.

In any embodiment disclosed herein, the FCC catalyst may include a calcined alumina matrix or an uncalcined alumina matrix. In some embodiments, the alumina matrix may be calcined. In some embodiments, the alumina matrix may be uncalcined.

The FCC catalyst may further include one or more additional materials. For example, in any embodiment disclosed herein, the FCC catalyst may further include a binder, alumina gel, peptized boehmite, pseudo-boehmite, kaolin, transitional alumina, or combinations of two or more thereof.

In any embodiment disclosed herein, the catalyst may further include a binder. Any such binder may be present from about 5 wt. % to about 25 wt. % based on total weight of the FCC catalyst. Other suitable amounts of the binder may include about 5 wt. %, about 7 wt. %, about 9 wt. %, about 11 wt. %, about 13 wt. %, about 15 wt. %, about 17 wt. %, about 19 wt. %, about 21 wt. %, about 23 wt. %, about 25 wt. %, or any range including and/or in between any two of the preceding values. Suitable binders may include, but are not limited to, a colloidal silica, silica hydrosol, alkali silicates (e.g., sodium silicates), or mixtures thereof.

In any embodiment disclosed herein, the FCC catalyst may include an alumina gel, peptized boehmite gel, or a mixture thereof. For example, in any embodiment disclosed herein, the FCC catalyst may include the alumina gel or peptized boehmite gel in an amount of 0 wt. % to about 10 wt. % based on total weight of the FCC catalyst. Suitable amounts of the alumina gel and/or peptized boehmite gel may include, but are not limited to, about 0.01 wt. %, about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any range including and/or in between any two of the preceding values. In any embodiment disclosed herein, the alumina matrix in addition to $\gamma\text{-Al}_2\text{O}_3$ may further include other transitional alumina phases that may include, but are not limited to, $\eta\text{-Al}_2\text{O}_3$, $6\text{-Al}_2\text{O}_3$, $\theta\text{-Al}_2\text{O}_3$, $\kappa\text{-Al}_2\text{O}_3$, $\chi\text{-Al}_2\text{O}_3$, or a combination of two or more thereof. Additionally or alternatively, in some embodiments, the alumina matrix may further include single or mixed phases of bayerite, gibbsite, boehmites, or mixtures thereof.

In any embodiment disclosed herein, the FCC catalyst may have a zeolite to matrix (Z/M) ratio of about 0.1 to about 0.7. As described herein, the term "Z/M" (or "zeolite to matrix ratio") refers to the ratio of zeolite surface area to matrix surface area. In any embodiment disclosed herein, the FCC catalyst may have a Z/M of about 0.1, about 0.2, about 0.3, about 0.4, about 0.5, about 0.6, about 0.7, or any range including and/or in between any two of these values.

In any embodiment disclosed herein, the FCC catalyst may be provided in any convenient form. For example, in any embodiment, the FCC catalyst may be shaped into microspheres. In any embodiment disclosed herein, the microspheres may have an average particle size of about 65 microns to about 120 microns. Suitable microsphere particle sizes may include, but are not limited to, about 65 microns, about 70 microns, about 75 microns, about 80 microns, about 85 microns, about 90 microns, about 95 microns, about 100 microns, about 105 microns, about 110 microns, about 115 microns, about 120 microns, or any range including and/or in between any two of these values.

In a related aspect, the present technology provides a process for preparing an FCC catalyst, where the process includes:

milling a first slurry includes an alumina matrix material to a D90 particle size distribution of about 8 microns or less, or milling a second slurry includes a Y-zeolite having a rare earth element or oxide thereof to a D90 particle size distribution of about 5 microns or less; or co-milling a slurry mixture comprising the Y-zeolite includes a rare earth element or oxide thereof and the alumina matrix material to a D90 particle size distribution of about 5 microns or less;

combining the alumina matrix and the Y-zeolite with one or more additional components to obtain a mixture;

spray drying the mixture to form microspheres; and calcining the microspheres to obtain the FCC catalyst, where the alumina matrix includes γ-Al$_2$O$_3$ or pseudoboehmite and a dopant; and the dopant is selected from a Group IIIB metal, a Group IVB metal, a Group IVA element, a Group VA element, an oxide thereof, or a combination of any two or more thereof.

In any embodiment disclosed herein, the process may include milling the first slurry to a D90 particle size of less than about 8 microns, about 7.5 microns, about 7 microns, about 6.5 microns, about 6 microns, about 5.5 microns, about 5 microns, about 4.5 microns, about 4 microns, about 3.5 microns, about 3 microns, about 2.5 microns, about 2 microns, or any range including and/or in between any two of these values. In any embodiment disclosed herein, the process may include milling the first slurry to a D90 particle size of less than about 8 microns to about 2 microns, less than about 5 microns to about 2 microns, less than about 4 microns to about 2 microns, or any range including and/or in between any two of these values.

In any embodiment disclosed herein, the process may include milling the second slurry to a D90 particle size of less than about 5 microns, about 4.5 microns, about 4 microns, about 3.5 microns, about 3 microns, about 2.5 microns, about 2 microns, or any range including and/or in between any two of these values. In any embodiment disclosed herein, the process may include milling the first slurry to a D90 particle size of less than about 5 microns to about 2 microns, less than about 4 microns to about 2 microns, less than about 3.5 microns to about 2 microns, or any range including and/or in between any two of these values.

In any embodiment disclosed herein, the process may further include combining the first slurry and the second slurry or the slurry mixtures with an acid to adjust the pH to about 5.0 or less. For example, in any embodiment herein, the pH may be adjusted to a pH of about 5.0, about 4.5, about 4.0, about 3.5, about 3.0, or any range including and/or in between any two of these values. In any embodiment disclosed herein, the combining the first slurry and the second slurry or the slurry mixtures with an acid may adjust the pH to about 3.0 to about 5.0. Suitable acids may include, but are not limited to formic acid, HNO$_3$, HCl, other monoprotic acids, or mixtures thereof.

The microspheres may have an average particle size of about 65 microns to about 120 microns. Suitable microsphere average particle sizes may include, but are not limited to, about 65 microns, about 70 microns, about 75 microns, about 80 microns, about 85 microns, about 90 microns, about 95 microns, about 100 microns, about 105 microns, about 110 microns, about 115 microns, about 120 microns, or any range including and/or in between any two of these values. In any embodiment disclosed herein, the microspheres may have an average particle size of about 65 microns to about 120 microns, about 75 microns to about 105 microns, or any range including and/or in between any two of these values.

The calcining may be performed at a temperature of about 950° F. (510° C.) to about 1650° F. (899° C.). For example, in any embodiment disclosed herein, the temperature may be about 950° F. (510° C.), about 1000° F. (538° C.), about 1050° F. (566° C.), about 1100° F. (593° C.), about 1150° F. (621° C.), about 1200° F. (649° C.), about 1250° F. (677° C.), about 1300° F. (704° C.), about 1350° F. (732° C.), about 1400° F. (760° C.), about 1450° F. (788° C.), about 1500° F. (816° C.), about 1550° F. (843° C.), about 1600° F. (871° C.), about 1650° F. (899° C.), or any range including and/or in between any two of these values. In any embodiment disclosed herein, the calcination temperature may be about 950° F. (510° C.) to about 1650° F. (899° C.), about 1050° F. (566° C.) to about 1350° F. (732° C.), or any range including and/or in between any two of these values.

The processes described herein form an FCC catalyst as described. The FCC catalyst that is formed may include about 5 wt. % to about 30 wt. % of the Y-zeolite based on total weight of the FCC catalyst. For example, in any embodiment disclosed herein the FCC catalyst obtained according to the process may include the Y-zeolite in an amount of about 5 wt. %, about 10 wt. %, about 15 wt. %, about 20 wt. %, about 25 wt. %, about 30 wt. %, or any amount including and/or in between any two of the preceding values. In any embodiment disclosed herein, the Y-zeolite may be present in an amount from about 5 wt. % to about 30 wt. %, about 10 wt. % to about 25 wt. %, about 10 wt. % to about 22 wt. %, about 12 wt. % to about 20 wt. %, or any range including and/or in between any two of the preceding values.

The FCC catalyst formed may include amounts of the alumina matrix of about 15 wt. % to about 65 wt. % based on total weight of the FCC catalyst. For example, in any embodiment disclosed herein, the FCC catalyst may include the alumina matrix in an amount from about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, or any range including and/or in between any two of the preceding values. In any embodiment disclosed herein, the FCC catalyst may include the alumina matrix in amounts from about 15 wt. % to about 65 wt. %, about 25 wt. % to about 60 wt. %, about 30 wt. % to about 50 wt. %, or any range including and/or in between any two of the preceding values.

The alumina matrix may include a dopant that is a Group IIIB metal, a Group IVB metal, or oxide thereof, where the alumina matrix includes the dopant in an amount of about 0.01 wt. % to about 10 wt. % based on total weight of the alumina matrix. Suitable amounts of dopant may be about 0.01 wt. %, about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any range including and/or in between any two of the preceding values. In any embodiment disclosed herein, the amount of dopant may be about 0.01 wt. % to about 10 wt. %, about 0.1 wt. % to about 10 wt. %, about 1 wt. % to about 6 wt. %, or any range including and/or in between any two of the preceding values.

The alumina matrix may include a dopant that is a Group IVA element, a Group VA element, or an oxide thereof, where the alumina matrix includes the dopant in an amount from about 0.01 wt. % to about 35 wt. % based on total weight of the alumina matrix. Suitable amounts of such dopant may include about 0.01 wt. %, about 0.05 wt. %, about 0.1 wt. %, about 0.5 wt. %, about 1 wt. %, about 3 wt. %, about 5 wt. %, about 7 wt. %, about 9 wt. %, about 11 wt. %, about 13 wt. %, about 15 wt. %, about 17 wt. %, about 19 wt. %, about 21 wt. %, about 23 wt. %, about 25 wt. %, about 27 wt. %, about 29 wt. %, about 31 wt. %, about 33 wt. %, about 35 wt. %, or any range including and/or in between any two of the preceding values. In any embodiment disclosed herein the Group IVA elements, Group VA elements, or oxides thereof in the alumina matrix may be about 0.01 wt. % to about 35 wt. %, about 0.1 wt. % to about 35 wt. %, about 3 wt. % to about 25 wt. %, or any range including and/or in between any two of the preceding values.

In any embodiment disclosed herein, the dopant may be a Group IIIB metal or oxide thereof, a Group IVA element or oxide thereof, or a combination of any two or more thereof. For example, the dopant may be selected from silicon, lanthanum, or mixtures thereof.

In any embodiment disclosed herein, the alumina matrix may include from about 50 wt. % to about 99 wt. % of $\gamma$-$Al_2O_3$ or pseudo-boehmite phase based on total weight of the alumina matrix. For example, the alumina matrix may include the $\gamma$-$Al_2O_3$ or pseudo-boehmite phase in an amount of about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 99 wt. %, or any range including and/or in between any two of the preceding values.

In any embodiment disclosed herein, the FCC catalyst prepared according to the process described herein may include a calcined alumina matrix or an uncalcined alumina matrix. In some embodiments, the alumina matrix may be calcined. In some embodiments, the alumina matrix may be uncalcined.

The process may further include combining one or more additional materials to the first slurry or second slurry or the mixture of slurries. For example, in any embodiment disclosed herein, the first slurry or second slurry or mixture of slurries may further include a binder, alumina gel, peptized boehmite, pseudo-boehmite, kaolin, transitional alumina, or combinations of two or more thereof.

In any embodiment disclosed herein, the FCC catalyst prepared according the process described herein may further include a binder. For example, in any embodiment disclosed herein, the FCC catalyst may include the binder in an amount of about 5 wt. % to about 25 wt. % based on total weight of the FCC catalyst. Suitable amounts of the binder may include about 5 wt. %, about 7 wt. %, about 9 wt. %, about 11 wt. %, about 13 wt. %, about 15 wt. %, about 17 wt. %, about 19 wt. %, about 21 wt. %, about 23 wt. %, about 25 wt. %, or any range including and/or in between any two of the preceding values. Suitable binders may include, but are not limited to, a colloidal silica, silica hydrosol, alkali silicates, or mixtures thereof.

In any embodiment disclosed herein, the FCC catalyst prepared according to the process as described herein may include an alumina gel, peptized boehmite gel, or mixtures thereof. For example, in any embodiment disclosed herein, the FCC catalyst may include the alumina gel or peptized boehmite gel in an amount of 0 wt. % to about 10 wt. % based on total weight of the FCC catalyst. Suitable amounts of the alumina gel and/or peptized boehmite gel may include, but are not limited to, about 0.01 wt. %, about 0.05 wt. %, about 0.1 wt. %, about 0.5 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, or any range including and/or in between any two of the preceding values.

In any embodiment disclosed herein, the FCC catalyst prepared according to the process as described herein may have a Z/M ratio of about 0.1 to about 0.7. In any embodiment disclosed herein, the FCC catalyst may have a Z/M of about 0.1, about 0.2, about 0.3, about 0.4, about 0.5, about 0.6, about 0.7, or any range including and/or in between any two of these values.

In any embodiment disclosed herein, the microspheres may have an average particle size of about 65 microns to about 120 microns. Suitable microsphere particle sizes may include, but are not limited to, about 65 microns, about 70 microns, about 75 microns, about 80 microns, about 85 microns, about 90 microns, about 95 microns, about 100 microns, about 105 microns, about 110 microns, about 115 microns, about 120 microns, or any range including and/or in between any two of these values.

In another aspect, the present technology provides an incorporated FCC catalyst prepared according to the process described herein in any embodiment.

In another aspect, the present technology provides a catalyst composition that includes a first FCC catalyst that includes a Y-zeolite having a rare earth element or oxide thereof and an alumina matrix; a second FCC catalyst that is different from the first FCC catalyst; and optionally additional FCC catalysts that are different from the first and second FCC catalyst; where the alumina matrix includes $\gamma$-$Al_2O_3$ or pseudo-boehmite and a dopant, and the dopant includes a Group IIIB metal, a Group IVB metal, a Group IVA element, a Group VA element, an oxide thereof, or a combination of any two or more thereof.

In any embodiment disclosed herein, the composition may include about 1 wt. % to about 99 wt. % of the first FCC catalyst based on total weight of the catalyst composition. Suitable amounts of the first FCC catalyst may include about 1 wt. %, about 2 wt. %, about 3 w.t %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt., about 99 wt. %, or any range including and/or in between any two of the preceding values. For example, the first catalyst may be present in an amount from about 1 wt. % to about 99 wt. %, about 5 wt. % to about 85 wt. %, about 10 wt. % to about 70 wt. %, about 15 wt. % to about 60 wt. %, about 20 wt. % to about 50 wt. % based on total weight of the composition or any range including and/or in between any these values. In any embodiment disclosed herein, the first FCC catalyst is a FCC catalyst as described herein in any embodiment.

In any embodiment disclosed herein, the composition may include about 1 wt. % to about 99 wt. % by weight of the second FCC catalyst based on total weight of the composition. Suitable amounts of the one or more additional FCC catalysts may include about 1 wt. %, about 2 wt. %, about 3 w.t %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt., about 99 wt. %, or any range including and/or in between any two of the preceding values. For example, the one or more additional FCC catalysts may be present in an amount from about 1 wt. % to about 99 wt. %, about 5 wt. % to about 85 wt. %, about 10 wt. % to about 70 wt. %, about 15 wt. % to about 60 wt. %, about 20 wt. % to about 50 wt. % based on total weight of the composition or any range including and/or in between any these values.

In any embodiment disclosed herein, the composition may optionally include about 1 wt. % to about 99 wt. % by weight of the additional FCC catalysts based on total weight of the composition. Suitable amounts of the optional additional FCC catalysts may include about 1 wt. %, about 2 wt. %, about 3 w.t %, about 4 wt. %, about 5 wt. %, about 6 wt. %, about 7 wt. %, about 8 wt. %, about 9 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt., about 99 wt. %, or any range including and/or in between any two of the preceding values. For example, the optional additional FCC catalysts may be present in an amount from about 1 wt. % to about 99 wt. %, about 5 wt. % to about 85 wt. %, about 10 wt. % to about 70 wt. %, about 15 wt. % to about 60 wt. %, about 20 wt. % to about 50 wt. % based on total weight of the composition or any range including and/or in between any these values.

In another related aspect, the present technology provides a method of cracking a hydrocarbon feed comprising contacting said feed with a FCC catalyst that includes a FCC catalyst as described herein in any embodiment.

The present invention, thus generally described, will be understood more readily by reference to the following examples, which are provided by way of illustration and are not intended to be limiting of the present invention.

EXAMPLES

Example 1: Preparation and evaluation of incorporated FCC catalysts with calcined alumina matrix. Table 1 provides the properties of two alumina matrix materials (AM1 and AM2) used to make FCC catalysts described in Samples A-C. AM1 and AM2 have been calcined at high temperatures with majority of alumina phase as gamma-($\gamma$)-$Al_2O_3$ with some other minor phases, such as $\chi$- and $\alpha$-$Al_2O_3$.

TABLE 1

Formulation and properties for calcined alumina matrix.

| | AM1 | AM2 |
|---|---|---|
| TSA ($m^2$/g) | 214 | 370 |
| $Al_2O_3$ (wt. %) | 96% | 99% |
| $SiO_2$ (wt. %) | 0 | 0.2% |
| $Na_2O$ (wt. %) | 0.1% | 0.322% |
| $La_2O_3$ (wt. %) | 3.5% | 0 |

The incorporated FCC Samples A-C were generally prepared by the following steps:

1. Milling an alumina matrix material (AM1 or AM2) in a slurry to until 90% of the particles of the material, i.e. D90, are smaller than about 8 microns.
2. Milling a Y-zeolite containing rare earth element or oxide thereof (REUSY) in a slurry until the D90 is smaller than about 5 microns.
3. Adjusting the pH of the slurries before, during, or after milling to a pH of less than about 5, with a monoprotic acid (i.e., formic acid).
4. Mixing the milled alumina matrix material (AM1 or AM2) and REUSY with colloidal silica (Nalco 2326), peptized alumina (PB950), kaolin slurry, and crystalline boehmite (Tor alumina).
5. Spray drying the mixture to form microspheres having an average particle size of about 65 microns to about 125 microns.
6. The resultant microspheres were calcined at a temperature of 950° F. to 1650° F.

These slurry components can be mixed at the same time or in sequence that produces a slurry mixture suitable for spray dry to shape into microspheres.

Table 2 below provides the formulation composition and properties for Samples A-C:

TABLE 2

Formulation and physical properties for FCC catalyst Samples A-C.

| | Sample A | Sample B | Sample C | Comparable in-situ FCC catalyst |
|---|---|---|---|---|
| | Formulation Composition (volatile free (VF) basis) | | | |
| Alumina matrix-calcined | 40 wt. % AM1 | 40 wt. % AM1 | 40 wt. % AM2 | |
| REUSY | 20 wt. % (5.1 wt. % REO) | 15 wt. % (8 wt. % REO) | 20 wt. % (7.7 wt. % REO) | |
| Colloidal silica | 15 wt. % | 15 wt. % | 15 wt. % | |
| Peptized alumina | 6.5 wt. % | 6.5 wt. % | 6.5 wt. % | |
| Crystalline boehmite | 9 wt. % | 9 wt. % | 9 wt. % | |
| kaolin | 9.5 wt. % | 9.5 wt. % | 9.5 wt. % | |
| | Catalyst Properties | | | |
| *TSA, $m^2$/g | 294 | 269 | 270 | 287 |
| **MSA, $m^2$/g | 205 | 202 | 188 | 125 |
| ***ZSA, $m^2$/g | 89 | 68 | 83 | 162 |
| $Na_2O$, wt. % | 0.07 | 0.09 | 0.22 | 0.2 |
| †REO, wt. % | 2.71 | 2.73 | 1.61 | 2.68 |
| ‡UCS, Å | 24.583 | 24.620 | 24.635 | |
| | 1450° F./24 h/100% steam | | | |

TABLE 2-continued

| | | | | Comparable in-situ FCC catalyst |
|---|---|---|---|---|
| | Sample A | Sample B | Sample C | |
| TSA, m²/g | 160 | 128 | 146 | 165 |
| MSA, m²/g | 100 | 87 | 103 | 89 |
| ZSA, m²/g | 60 | 40 | 43 | 76 |
| Z/M | 0.60 | 0.46 | 0.42 | 0.85 |
| sUCS, Å | 24.35 | 24.38 | 24.38 | 24.33 |

*TSA = total surface area;
**MSA = matrix surface area;
***ZSA = zeolite surface area;
†REO = rare earth oxide;
‡UCS = unit cell size.

As shown in Table 2, Samples A-C have different REO, UCS, and Y-zeolite content and different alumina matrix. After steam deactivation at 1450° F./24 h/100%, these samples have low sZ/M (0.4~0.6). Sample C has a lower Z stability due to higher Na content in AM2. Both Samples B and C have similar sZSA and sUCS. CRU (circulating riser unit) testing was used for evaluation of these samples. The results at a constant conversion of 76% are summarized in Table 3 below relative to the comparable in-situ Y-zeolite FCC catalyst control.

TABLE 3

CRU testing for FCC catalyst Samples A-C.

| Delta Yields relative to Control (wt. %) | Sample A | Sample B | Sample C |
|---|---|---|---|
| Hydrogen | −0.05 | −0.05 | −0.06 |
| C3= | −0.02 | 0.16 | −0.15 |
| Total C4=s | 0.09 | 0.31 | −0.33 |
| Dry Gas | −0.05 | −0.08 | −0.18 |
| LPG | −0.06 | 0.54 | −0.72 |
| Gasoline | 0.54 | −0.02 | 1.25 |
| LCO | −0.04 | −0.19 | −0.22 |
| Bottoms | 0.04 | 0.19 | 0.22 |
| Coke | −0.42 | −0.44 | −0.35 |

As shown in Table 3 above, the exemplary incorporated FCC catalyst Samples A-C exhibited improved coke selectivity compared to the control in situ FCC catalyst. The results indicated that varying Y-zeolite content (Z/M) or REO (UCS) has small impact on bottoms upgrading. For the same AM1, varying Z/M and REO (UCS) for Samples A and B impacts other product selectivity. Sample B compared to Sample A exhibited a higher UCS and a higher LPG and olefins selectivity. Sample A and B's product distribution results compared to Sample C indicated that the alumina matrix properties impacted product selectivity. In other words, FCC catalysts containing AM1 produced more LPG/olefins while AM2 produced more gasoline. Accordingly, AM1 (3.5 wt. % of $La_2O_3$ dopant) in FCC catalyst composition is very beneficial for C4=, while AM2 (0.2 wt. % $SiO_2$ dopant) yields excellent gasoline with lower olefins/LPG.

As shown above, the CRU testing of prototype demonstrates the exemplary FCC catalyst Samples A-C exhibited 9-10% better bottoms upgrading compared to the control in-situ FCC catalyst.

Example 2: Preparation and evaluation of incorporated FCC catalysts with uncalcined alumina matrix. Uncalcined alumina matrix containing primarily pseudo-boehmite phase are outlined in Table 4, which provides the formulation and properties for the alumina matrix material (AMV3-AMN8).

TABLE 4

Formulation and physical properties for uncalcined alumina matrix.

| Sample | Na₂O, wt. % | Al₂O₃, wt. % | SiO₂, wt. % | REO*, wt. % | TSA, m²/g |
|---|---|---|---|---|---|
| AM3 | 0.79 | 84.5 | 14.4 | 0 | 328 |
| AM4 | 0.65 | 83.9 | 13.5 | 1.77 | 253 |
| AM5 | 1.02 | 70.4 | 28.3 | 0 | 302 |
| AM6 | 1.0 | 69.5 | 27.5 | 1.84 | 238 |
| AM7 | 0.48 | 96.6 | 2.8 | 0 | 266 |
| AM8 | 0.27 | 84.9 | 14.5 | 0 | 352 |

*REO dopant is lanthanum oxide

The incorporated FCC catalysts of Samples D-J were prepared according to the procedure described in Example 1 above. As shown in Table 5 below, FCC catalyst Samples D-J incorporate alumina matrix materials AM3-AM8 having modified dopants (i.e., Si and/or La) at different contents.

TABLE 5

Formulation and physical properties for FCC catalyst Samples D-I.

| | Sample D | Sample E | Sample F | Sample G | Sample H | Sample I |
|---|---|---|---|---|---|---|
| | Formulation Composition (VF basis) | | | | | |
| Alumina matrix-uncalcined | 40 wt. % AM3 | 40 wt. % AM4 | 40 wt. % AM5 | 40 wt. % AM6 | 40 wt. % AM7 | 40 wt. % AM8 |
| REUSY | 15 wt. % (8 wt. % REO) | 15 wt. % (8 wt. % REO) | 15 wt. % (8 wt. % REO) | 15 wt. % (8 wt. % REO) | 15 wt. % (8 wt. % REO) | (8 wt. % REO) 15 wt. % |
| Colloidal silica | 15 wt. % | 15 wt. % | 15 wt. % | 15 wt. % | 15 wt. % | 15 wt. % |
| Peptized alumina | 6.5 wt. % | 6.5 wt. % | 6.5 wt. % | 6.5 wt. % | 6.5 wt. % | 6.5 wt. % |

TABLE 5-continued

| Formulation and physical properties for FCC catalyst Samples D-I. | | | | | |
|---|---|---|---|---|---|
| | Sample D | Sample E | Sample F | Sample G | Sample H | Sample I |
| kaolin | 23.5 wt. % | 23.5 wt. % | 23.5 wt. % | 23.5 wt. % | 23.5 wt. % | 23.5 wt. % |
| | | | Catalyst Properties | | | |
| TSA, $m^2/g$ | 233 | 246 | 242 | 246 | 241 | 251 |
| MSA, $m^2/g$ | 174 | 187 | 179 | 191 | 186 | 194 |
| ZSA, $m^2/g$ | 59 | 59 | 63 | 54 | 54 | 57 |
| $Na_2O$, wt. % | 0.395 | 0.45 | 0.50 | 0.44 | 0.33 | 0.24 |
| REO, wt. % | 2.14 | 1.46 | 2.13 | 1.48 | 1.36 | 1.38 |
| | | | 1450° F./24 h/100% steam | | | |
| TSA, $m^2/g$ | 108 | 113 | 105 | 112 | 109 | 130 |
| MSA, $m^2/g$ | 71 | 78 | 70 | 81 | 76 | 95 |
| ZSA, $m^2/g$ | 37 | 35 | 34 | 31 | 32 | 35 |
| Z/M | 0.52 | 0.45 | 0.49 | 0.38 | 0.42 | 0.37 |
| sUCS, Å | 24.34 | 24.33 | 24.33 | 24.32 | 24.33 | 24.33 |

ACE testing was ACE testing results below indicate that modification of alumina matrix with high Si-doping and/or some La-doping impacts product selectivity for the same alumina phase. In particular, Si- and/or La-doping of the uncalcined alumina matrix exhibits reduced coke and hydrogen formation and improved bottoms upgrading.

modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and

TABLE 6

| ACE testing for FCC catalyst Samples D-I. | | | | | | |
|---|---|---|---|---|---|---|
| @Const. 73 wt. % conversion | Sample D | Sample E | Sample F | Sample G | Sample H | Sample I |
| H2 | 0.16 | 0.13 | 0.14 | 0.12 | 0.17 | 0.15 |
| C3═ | 6.1 | 6.2 | 6.1 | 6.1 | 6.2 | 6.3 |
| Total C4═ | 8.3 | 8.2 | 8.1 | 8.0 | 8.4 | 8.5 |
| Dry Gas | 3.1 | 3.0 | 3.1 | 3.0 | 3.1 | 3.1 |
| LPG | 19.6 | 19.9 | 19.6 | 19.7 | 19.8 | 20.3 |
| Gasoline | 47.0 | 47.0 | 46.9 | 47.1 | 46.7 | 46.2 |
| LCO | 15.9 | 15.7 | 15.7 | 15.6 | 15.8 | 15.7 |
| Bottoms | 11.1 | 11.3 | 11.3 | 11.4 | 11.2 | 11.3 |
| Coke | 3.37 | 3.15 | 3.37 | 3.16 | 3.45 | 3.46 |
| Cat/Oil | 7.6 | 7.5 | 8.0 | 8.0 | 7.0 | 6.5 |

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A fluid catalytic cracking (FCC) catalyst composition comprising a Y-zeolite, wherein the Y-zeolite comprises a rare earth element or oxide thereof, and a modified alumina matrix, wherein:

the modified alumina matrix comprises $\gamma$-$Al_2O_3$ or pseudo-boehmite and a dopant; and wherein the dopant comprises yttrium (Y), scandium (Sc), praseodymium (Pr), neodymium (Nd), samarium (Sm), europium (Eu), gadolinium (Gd), cerium (Ce), lanthanum (La), titanium (Ti), zirconium (Zr), an oxide thereof, or a combination of any two or more thereof, in an amount of about 0.01 wt % to about 10 wt % based on total weight of the alumina matrix;

or, wherein the dopant comprises germanium (Ge), tin (Sn), bismuth (Bi), an oxide thereof, or a combination of any two or more thereof, in an amount from about 0.01 wt % to about 35 wt % based on total weight of the alumina matrix, wherein the catalyst comprises about 15 wt % to about 65 wt % of the modified alumina matrix based on total weight of the catalyst.

2. The FCC catalyst of claim 1, wherein the catalyst comprises about 5 wt. % to about 30 wt. % of the Y-zeolite based on total weight of the catalyst.

3. The FCC catalyst of claim 1, wherein the catalyst comprises about 10 wt. % to about 25 wt. % of the Y-zeolite based on total weight of the catalyst.

4. The FCC catalyst of claim 1, wherein the rare earth element is lanthanum or an oxide thereof.

5. The FCC catalyst of claim 1, wherein the Y-zeolite comprises from about 0.1 wt. % to about 12 wt. % of the rare earth element or oxide thereof based on total weight of the Y-zeolite.

6. The FCC catalyst of claim 1, wherein the catalyst comprises about 30 wt % to about 50 wt % of the modified alumina matrix based on total weight of the catalyst.

7. The FCC catalyst of claim 1, wherein the dopant comprises yttrium (Y), scandium (Sc), praseodymium (Pr), neodymium (Nd), samarium (Sm), europium (Eu), gadolinium (Gd), cerium (Ce), lanthanum (La), titanium (Ti), zirconium (Zr), an oxide thereof, or a combination of any two or more thereof.

8. The FCC catalyst of claim 1, wherein the dopant comprises germanium (Ge), tin (Sn), bismuth (Bi), an oxide thereof, or a combination of any two or more thereof.

9. The FCC catalyst of claim 1, wherein the dopant is selected from La, Ce, an oxide thereof, or a combination of any two or more thereof.

10. The FCC catalyst of claim 1, wherein the dopant present in the modified alumina matrix is selected from lanthanum, an oxide thereof, or a combination thereof.

11. The FCC catalyst of claim 1, wherein the modified alumina matrix comprises from about 50 wt. % to about 99 wt. % of $\gamma$-$Al_2O_3$ or pseudo-boehmite phase.

12. The FCC catalyst of claim 1, further comprising a binder, alumina gel, peptized boehmite, pseudo-boehmite, kaolin, transitional alumina, or combinations thereof.

13. A process for preparing the FCC catalyst composition of claim 1, the process comprising:

milling a first slurry comprising an alumina matrix material to a D90 particle size distribution of about 8 microns or less, and milling a second slurry comprising a Y-zeolite comprising a rare earth element or oxide thereof to a D90 particle size distribution of about 5 microns or less;

or co-milling a slurry mixture comprising the Y-zeolite comprising a rare earth element or oxide thereof and the alumina matrix material to a D90 particle size distribution of about 5 microns or less;

combining the alumina matrix and the Y-zeolite with one or more additional components to obtain a mixture;

spray drying the mixture to form microspheres; and calcining the microspheres to obtain the FCC catalyst.

14. The process according to claim 13, further comprising combining the first slurry and the second slurry or the slurry mixtures with an acid to adjust the pH to about 5 or less.

15. The process according to claim 14, wherein the pH is about 3 to about 5.

16. The process of according to claim 14, wherein the acid is selected from formic acid, $HNO_3$, HCl, or any other monoprotic acids.

17. A catalyst composition comprising:

a first FCC catalyst in accordance with claim 1;

a second FCC catalyst that is different from the first FCC catalyst; and optionally additional FCC catalyst that are different from the first and second FCC catalyst.

* * * * *